W. R. LOW.
Improvement in Harvesters.

No. 132,970. Patented Nov. 12, 1872.

Witnesses:

Inventor:
William R. Low

UNITED STATES PATENT OFFICE.

WILLIAM R. LOW, OF SANDWICH, ILLINOIS.

IMPROVEMENT IN HARVESTERS.

Specification forming part of Letters Patent No. 132,970, dated November 12, 1872.

*To all whom it may concern:*

Be it known that I, WILLIAM R. LOW, of Sandwich, in the county of De Kalb and State of Illinois, have invented certain Improvements in Harvester-Platforms, of which the following is a specification:

Nature of the Invention.

This invention relates to that class of harvesters in which the grain is taken as it falls over the sickle-bar and carried sidewise off the platform by a raking mechanism; and the invention consists in providing the platform and way for the grain with a movable backboard capable of being adjusted in the direction of the sickle-bar to and from said bar, regulating the width of the platform and way to the length of the grain, so that short straw will not become entangled by getting crosswise and obstruct the mechanism, all of which will hereinafter more fully appear.

Figure 1:
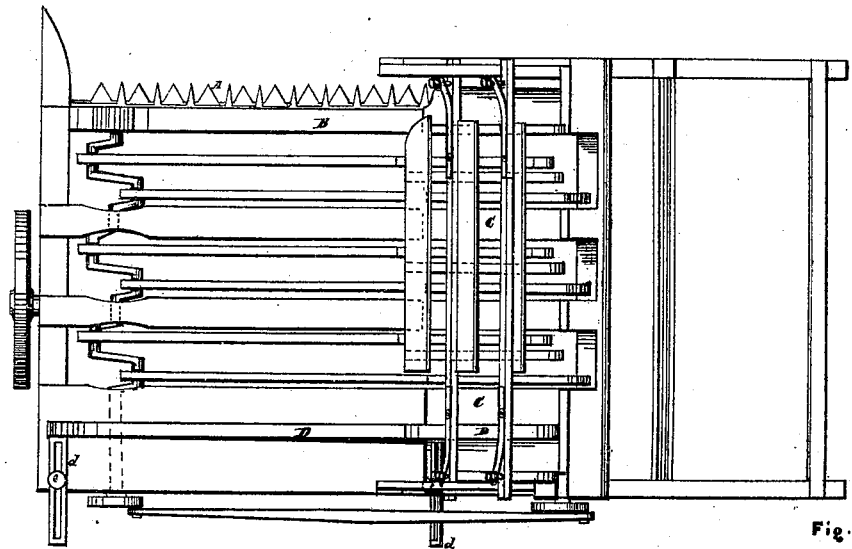
Figure 2:
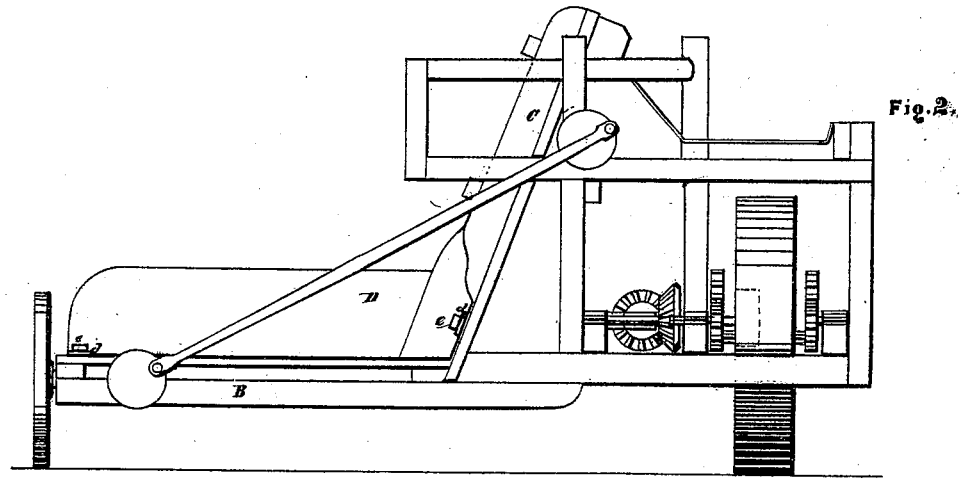

In the accompanying drawing, which forms part of this specification, Figure 1 is a top or plan view of a harvester constructed with my improvement, and Fig. 2 is a rear elevation of the same.

Like letters of reference made use of in the several figures indicate corresponding parts.

To enable those skilled in the art to make and use my invention, I will proceed to describe the same with particularity, making use, in so doing, of the aforesaid drawing by letters of reference thereto.

General Description.

A is the sickle-bar, and B the platform of a harvester containing a well-known mechanism for moving the grain off from the platform as it is cut, and carrying it up an inclined way, C, all by means of a system of parallel, alternating, vibrating bars swung upon cranked shafts, which mechanism is sufficiently illustrated in the drawing. D is a vertical partition or wall, which I term the backboard of the platform. This backboard is fitted with slotted arms or slides $d$, standing along the surface upon which the backboard rests, and secured to said surface by bolts $e$. By loosening the bolts $e$ the backboard may be set forward or back at pleasure, and to the desired distance from the sickle-bar to accommodate grain of any length of straw.

Having thus fully described the construction and operation of my invention, what I claim as new, and desire to secure by Letters Patent, is—

The adjustable backboard D, fitted to move on slides $d$ or their equivalents, in combination with the platform B of a harvester, all constructed and operating substantially as and for the purpose specified.

WILLIAM R. LOW.

Witnesses:
   S. B. STINSON,
   J. W. DAVID.